United States Patent [19]

Beernink et al.

[11] Patent Number: 5,680,480
[45] Date of Patent: Oct. 21, 1997

[54] METHOD AND APPARATUS FOR TRAINING A RECOGNIZER

[75] Inventors: Ernest H. Beernink, San Carlos; David T. Temkin, San Francisco, both of Calif.; Donna M. Auguste, Lyons, Colo.

[73] Assignee: Apple Computer, Inc., Cupertino, Calif.

[21] Appl. No.: 282,199

[22] Filed: Jul. 29, 1994

[51] Int. Cl.$^6$ .................................................. G06K 9/62
[52] U.S. Cl. ...................... 382/187; 382/155; 382/161
[58] Field of Search .............................. 382/13, 57, 59, 382/187, 188, 189, 229, 155, 156, 157, 158, 159, 160, 161

[56] References Cited

U.S. PATENT DOCUMENTS

| | | | |
|---|---|---|---|
| 3,133,266 | 5/1964 | Frishkopf | 382/186 |
| 4,672,677 | 6/1987 | Yamakawa | 382/57 |
| 5,157,737 | 10/1992 | Sklarew | 382/13 |
| 5,267,327 | 11/1993 | Hirayama | 382/57 |
| 5,285,505 | 2/1994 | Kim et al. | 382/187 |
| 5,315,667 | 5/1994 | Fujisaki et al. | 382/13 |
| 5,319,721 | 6/1994 | Chefalas et al. | 382/187 |
| 5,345,543 | 9/1994 | Capps et al. | 395/137 |
| 5,367,453 | 11/1994 | Capps et al. | 364/419.13 |
| 5,454,046 | 9/1995 | Carman, II | 382/186 |

OTHER PUBLICATIONS

O'Connor, Rory J., "Apple Banking on Newton's Brain", Apr. 22, 1992, San Jose Mercury News.

Weiman, Liza and Moran, Tom, "A Step Toward the Future", Aug. 1992, Macworld Magazine.

Soviero, Marcelle M., "Your World According to Newton", Sep. 1992, Popular Science Magazine.

Abatemarco, Fred, "From the Editor", Sep. 1992, Popular Science Magazine.

Cohen, Raines, "Slimmed–Down MessagePad to Beef up RAM, Recognition," Feb. 14, 1994, MacWeek, vol. 8, No. 7, pp. 1 and 84.

*Primary Examiner*—Leo Boudreau
*Assistant Examiner*—Chris Kelley
*Attorney, Agent, or Firm*—Hickman Beyer & Weaver

[57] ABSTRACT

A method and apparatus for training a recognizer includes displaying a practice word on a display screen of a pen-based computer system and entering a handwritten word that is similar to the practice word on the display screen. A recognized candidate list that includes candidate words and an associated confidence level for each candidate word is derived from the handwritten word by a recognizer. The confidence level indicates how confidently the handwritten word has been matched to the associated candidate word. The candidate list is displayed and a training database is updated with training data derived from the handwritten word. The training data is used by the recognizer to recognize other handwritten words with greater accuracy. A practice word that is either easily recognized by the recognizer or recognized with difficulty can be displayed, and the easily recognized practice words are randomly retrieved from a dictionary tree of characters to provide words of reasonable length and a variety of types and combinations of characters.

39 Claims, 12 Drawing Sheets

METHOD AND APPARATUS FOR TRAINING A RECOGNIZER

BACKGROUND OF THE INVENTION

The present invention relates generally to computer systems, and more particularly to methods for improving the ability of computer systems to recognize a user's handwriting.

Computerized personal organizers are becoming increasingly popular. They perform such functions as keeping a calendar, an address book, a to-do list, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information.

The recognition software used currently in many pen-based computer systems can sometimes recognize an inked word incorrectly. The misrecognition may be due to the style of the user's handwriting, which can vary dramatically among different users. Misrecognition can also be caused by the user writing a word which is ambiguous or includes letters which are difficult to distinguish from other letters. If a user's handwriting does not generally appear like standardized handwriting letters, then a recognizer often has difficulty in recognizing words of the handwriting.

What is needed is a method and apparatus for training a recognizer of a pen-based computer system to recognize a specific user's handwriting. Such a system should also provide the user opportunities to practice and improve his or her handwriting style to allow more accurate recognition.

SUMMARY OF THE INVENTION

The present invention provides a method and apparatus for training a recognizer of a pen-based computer system to recognize a user's handwriting more accurately. A recognizer analyzes a user's handwritten word and provides a list of candidate words indicating how close the user's ink is to a practice word. The recognizer associates portions of the handwritten ink with the practice word with trig data to recognize inked words more accurately.

A method of the present invention includes the steps of providing a practice word on a pen-based computer system and entering a first handwritten word that is similar to the practice word using a stylus on a display screen of said pen-based computer system. A recognized candidate list derived from the first handwritten word is then obtained from a recognizer. The candidate list includes at least one candidate word and an associated confidence level for each candidate word. The confidence level indicates how confidently the first handwritten word has been matched to the associated candidate word. The method also includes displaying the candidate list on a display screen of the pen-based computer system and updating a training database with training data derived from the first handwritten word. When a second handwritten word is entered, the training data is used by the recognizer to recognize the second handwritten word with greater accuracy.

The method includes displaying the practice word on the display screen of the pen-based computer. The pen-based computer can either display a practice word that is easily recognized by the recognizer, or a practice word that is recognized with difficulty. Providing an easily recognized practice word includes retrieving a number of random words from a dictionary tree of characters and selecting one of the random words to be the practice word. Providing a word that is recognized with difficulty includes selecting a random word from a predetermined difficult list of difficult words. The step of updating a training database includes saving training data which describes portions of the first handwritten word which are associated with the practice word. Training data is preferably associated with a particular user so that the recognizer can use specific training data to recognize a particular user's handwriting.

A computer system of the present invention includes a digital processor, read/write memory, and a display screen. A mechanism for providing a practice word to the display screen and a pointing device to enter a first ink object into the computer system are also included. A recognizer analyzes the first ink object and provides a recognized candidate list to be displayed on the display screen. The candidate list includes at least one candidate word and an associated confidence level for each candidate word. The confidence level indicates how confidently the first ink object has been matched to the associated candidate word. Finally, the computer system includes means for updating a training database with training data derived from the first ink object such that the practice word can be associated with the training data. The training data is used to recognize a second ink object, similar to the first ink object, more accurately. A practice word that is either easily recognized or recognized with difficulty can be provided. Means for displaying a predetermined number of candidate words from the candidate list provided by the recognizer is also included.

The present invention further includes a method for providing and displaying practice words to a user of a pen-based computer system. The method includes retrieving random words from a dictionary tree of characters, where each random word includes a number of characters. A character pair score is calculated for each pair of characters in each random word, and a random word is selected having the highest character pair score for the random words. The selected word is the practice word for a user of a pen-based computer system. The method preferably includes randomly selecting one of a number of possible next characters for each character selected from the dictionary tree. Each character in the tree includes an indicator indicating if the character can be used to terminate the random word; a random word is terminated at a character when the character includes the terminator and a randomly generated number falls within a predetermined threshold. A retrieved random word is not used as the practice word if the retrieved word is longer than a predetermined length of characters.

The step of calculating a character pair score includes incrementing the score of a character pair in a random word if the character pair has not already been found in the random word. An entry field is preferably displayed in which the user can write, with a stylus, a handwritten word which represents the practice word. The handwritten word is preferably recognized and an indication of how close the handwritten word is to the practice word is displayed.

The present invention includes the advantage of training a recognizer to recognize a particular user's handwriting by providing portions of ink written by the user and associating that ink with portions of a recognized word. The recognizer can thus reference the training data when recognizing additional words entered by that user. The present invention also includes the advantage of providing a random practice word to a user of a reasonable length and a variety of types and combinations of characters.

These and other advantages of the present invention will become apparent to those skilled in the art upon a reading of the following specification of the invention and a study of the several figures of the drawing.

DETAILED DESCRIPTION OF THE PREFERRED EMBODIMENT

The present invention is well suited for pointer-based computer systems such as the pen-based, pen-aware and mouse controlled systems that are currently popular. For the purposes of illustration, the invention will be described in connection with a pen-based computer system.

Figure 1:
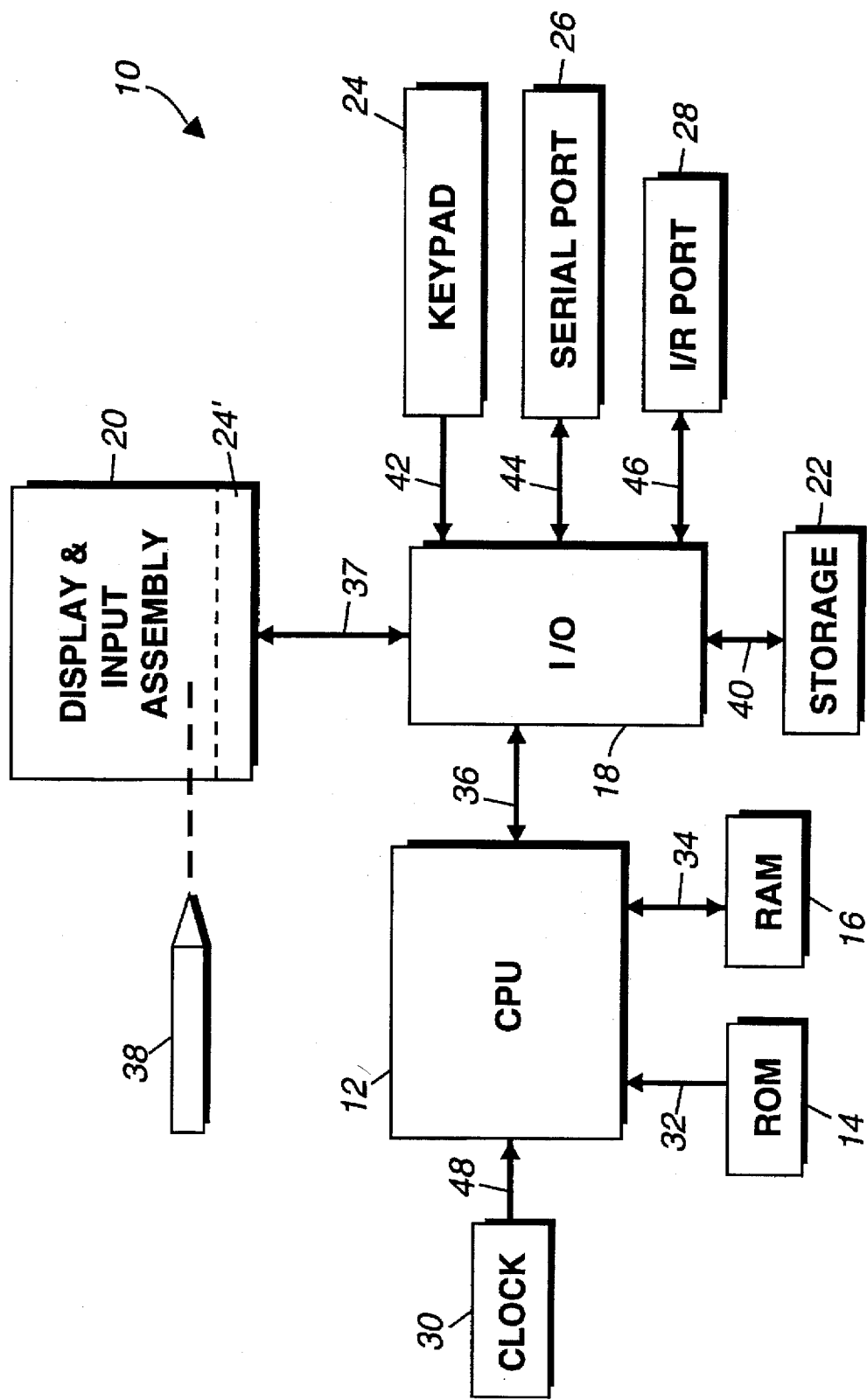
FIG. 1 is a block diagram of a pen-based computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
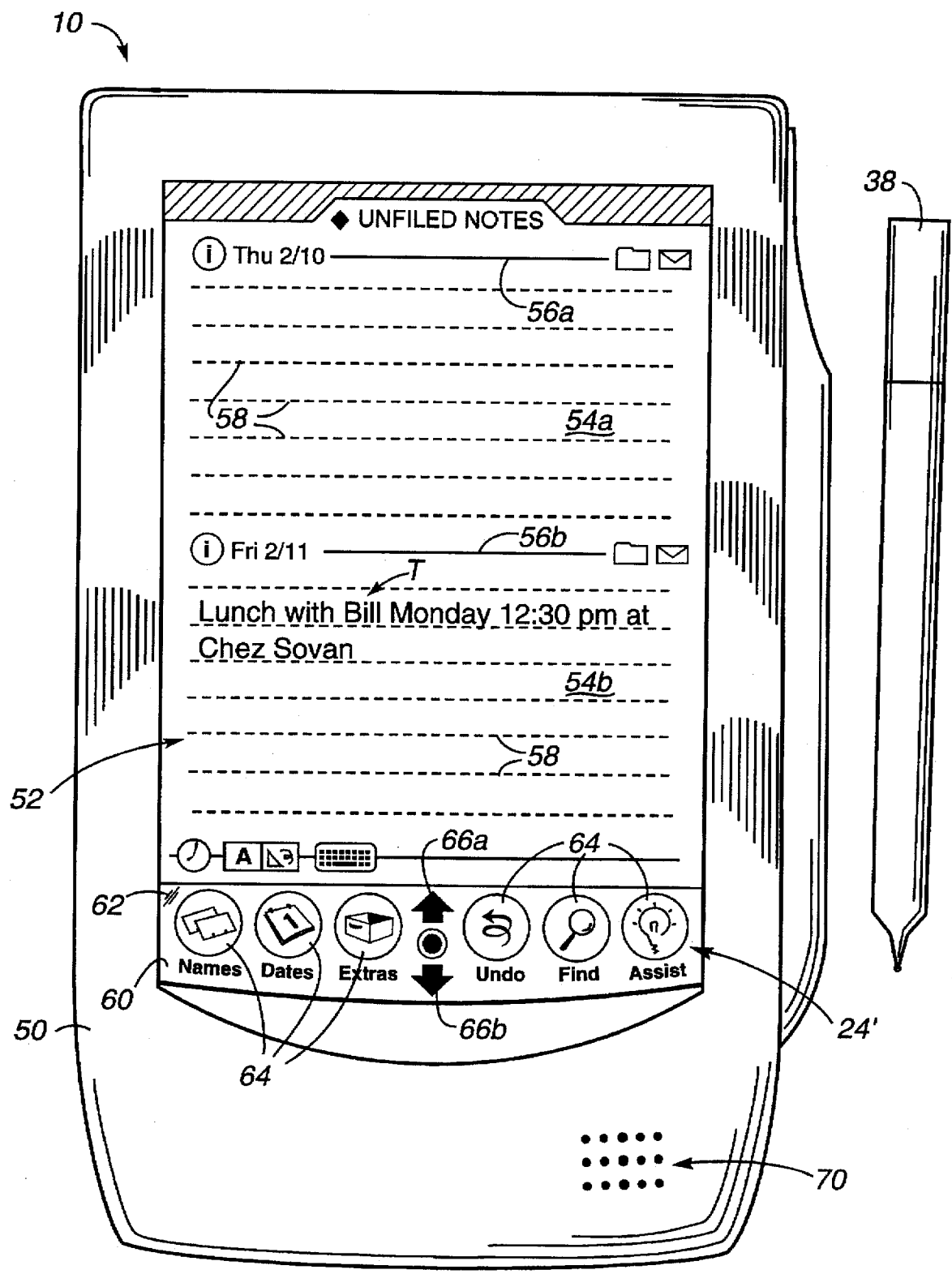
FIG. 2 is a top plan view of the pen-based computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation, Sharp, and others include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20. If these images are simply a line of pixels corresponding to a stroke of a stylus, they are referred to as electronic "ink."

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T is a phrase that has been entered into second note area 54b. In the described embodiment, text object T was originally entered as several strokes of "ink" which were recognized by the CPU and converted into printed words of the object T.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No, 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker which is housed within enclosure 50. The speaker can be used to provide user feedback, or to transmit audible information to a user. Alternatively, apertures 70 and the speaker can be used as a dual function speaker/microphone.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56*a* and 56*b* include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

The present invention makes use of a recognizer implemented by CPU 12 to recognize ink strokes (a set of strokes being collectively called an "ink object") input by a user by stylus 38. The recognizer analyzes an ink object and attempts to match the ink object to a letter, word, shape, or other symbol present in a database accessible to the recognizer. The database can be implemented in memory such as RAM 16 or mass storage 22. In the present invention, the recognizer analyzes words input as ink strokes and provides a list of "candidate words" which the recognizer has chosen as possible matches. Each candidate word has a confidence level associated with it which indicates how certain the recognizer is that the ink object corresponds to the candidate word. Recognition software which performs such functions is well known to those skilled in the art. A preferred recognizer for use with the present invention appears in co-pending U.S. patent application Ser. No. 08/068,443 filed May 27, 1993 by Beernink et al., which is entitled "Method and Apparatus for Recognizing Handwritten Words", is assigned to the assignee of the present invention and is incorporated herein by reference. Additional information describing a suitable handwriting recognition process is described in co-pending U.S. patent application Ser. No. 08/001,123 Filed Jan. 5, 1993 by Giulia Pagallo et al., titled "Method and Apparatus for Computerized Recognition", which is assigned to the assignee of the present invention and incorporated herein by reference.

Figure 3A:
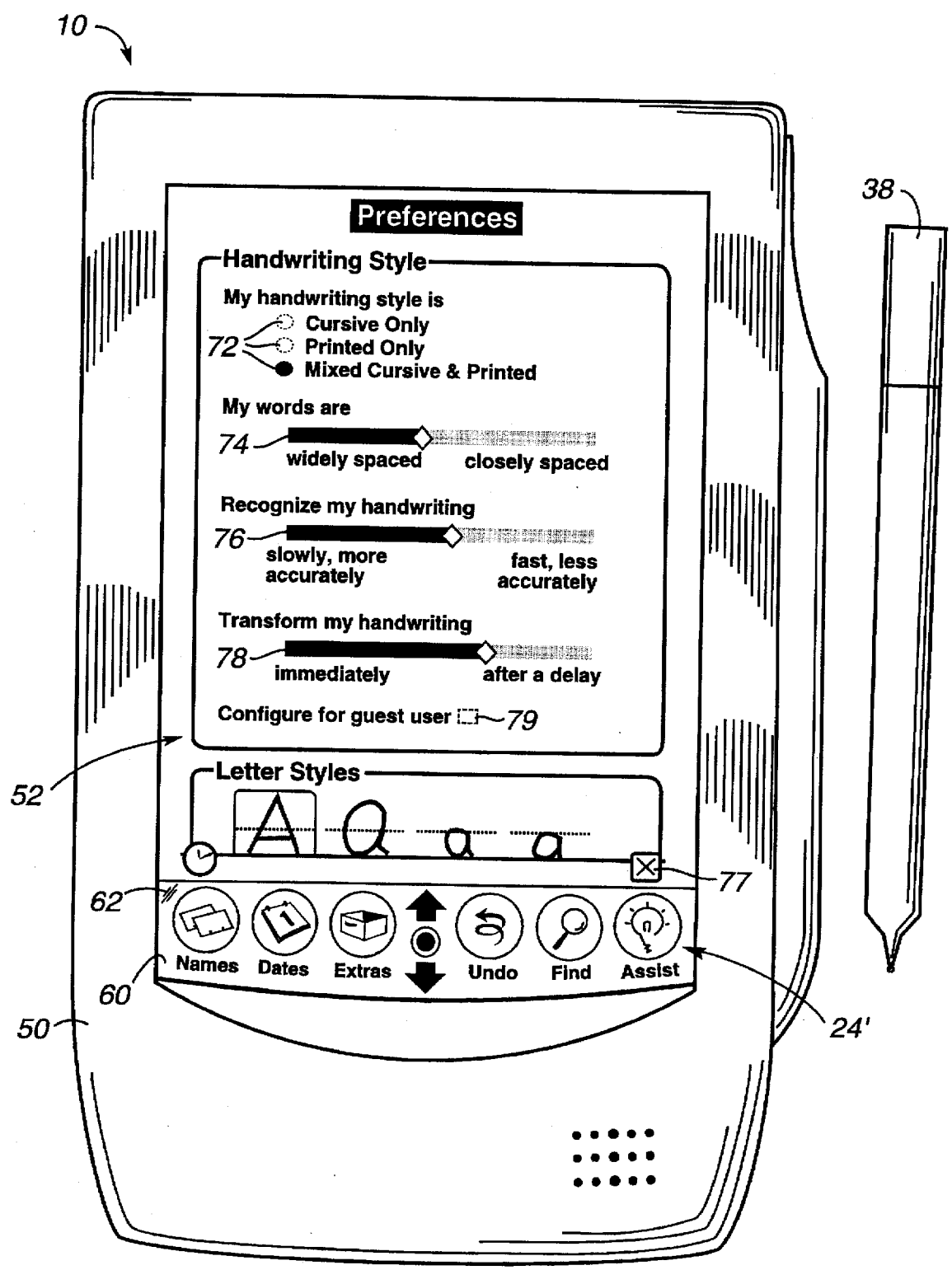
FIG. 3a is a top plan view of the pen-based computer showing a handwriting preferences screen.

FIG. 3*a* is a top view of pen-based computer system 10 housed in enclosure 50 as shown in FIG. 2. Display screen 52 shows preference options for a user's handwriting style which are preferably implemented by the present invention. Preferences which the user may adjust or select include handwriting style, word spacing, recognition speed, and handwriting transformation speed. A preferred handwriting style can be selected by touching one of the selection boxes 72 with a stylus. Options include cursive only, printed only, and mixed cursive and printing. By providing this information to the CPU 12, the user allows the recognition software to recognize handwriting more accurately.

Another preference is word spacing. By adjusting the slider control 74 with a pointing device, a user can inform the recognizer that the words of his or her handwriting are spaced apart widely, an intermediate amount, or closely. The recognition speed preference can be selected by adjusting slider bar 76 to cause the recognizer to recognize and output a guess more quickly or more slowly. The handwriting transformation speed preference can be selected by slider bar 78 to instruct the recognizer to immediately begin recognizing a written word, or to wait a short time before attempting to recognize a word. Guest user button 79 can be selected by the user to set computer system 10 in "guest mode" to provide a different set of saved preferences for a different user of pen-based computer system 10; otherwise the preferences are set at the most recent settings saved in battery backed-up RAM. Guest mode, selected by button 79, also instructs the recognizer to recognize the user's handwriting using training data associated with the guest user. When button 79 is not selected, the recognizer uses training data associated with the primary user to recognizer handwritten words. The abovementioned handwriting style preferences and guest mode are described in greater detail in co-pending patent application entitled "Method and Apparatus for Recognizing Handwriting of Different Users of a Pen-based Computer System", by Beernink et al., Ser. No. 08/282,785, Docket no. P1132, filed on an even day herewith, assigned to the same assignee as the present invention and hereby incorporated by reference herein. The preferences selected are preferably stored in a system database and are thus available to the recognizer to be used in recognizing the user's handwritten input.

Figure 3B:
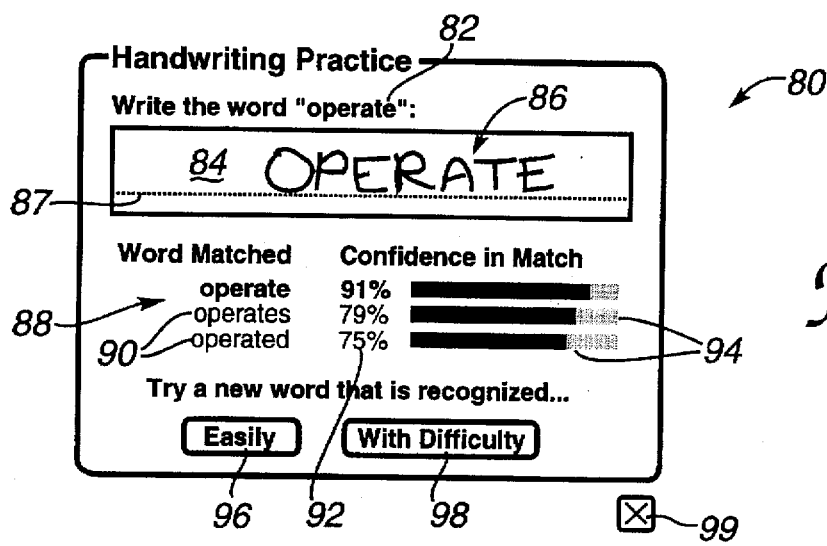
FIG. 3b is a portion of the display screen of the pen-based computer showing the handwriting training interface of the present invention.

FIG. 3*b* is a diagrammatic illustration of a handwriting training interface 80 as displayed on screen 52 of pen-based computer system 10. Interface 80 is preferably displayed as a view in the view system. The CPU displays a practice word 82 which the user is to practice writing and help train the recognizer to recognize his or her handwriting. When interface 80 is first displayed, practice word 82 is preferably a random "easily recognized" word (explained below). Alternately, the initial practice word can be randomly selected from the "recognized with difficulty" list. If interface 80 is not closed and previous practice words have been displayed, then practice word 82 is selected according to buttons 96 and 98 as described below.

Handwriting entry field 84 receives a handwritten word as input into the computer system from a user. A user preferably writes a word, such as word 86, as a set of strokes displayed as electronic ink along a dotted line 87 with a stylus. In alternate embodiments, handwritten word 86 can be input with a different pointing device, such as a mouse or trackball. The handwritten word is displayed as an ink object in the entry field 84. The recognizer receives the ink strokes of the ink object, analyzes the object, and provides a candidate list 88 which is displayed by the CPU in interface 80. Candidate list 88 includes a number of candidate words 90 which have been matched to the handwritten word and an associated confidence level 92 for each of the candidate words. The confidence level is preferably displayed as a percentage and as a bar graph 94 and shows the confidence of the recognizer that the candidate word is equivalent to the handwritten word. If the candidate word with the highest confidence level matches the practice word, then the user's entered ink strokes have been correctly recognized. In the described embodiment, the top three candidate words generated by the recognizer are displayed as candidate list 88. In alternate embodiments, more or fewer candidate words can be displayed. Also in the described embodiment, if a candidate word 90 generated by the recognizer and displayed in interface 80 corresponds to the practice word 82, then that candidate word is displayed in boldface. The word can be highlighted or otherwise marked in alternate embodiments. The recognizer also enters the user's handwriting into a database to help the recognizer more accurately recognize the user's particular style of writing (described with reference to FIG. 4). If the user engages the stylus tip with entry field 84 after a word has been recognized, any previous ink that was displayed in field 84 is erased. The user can again attempt to write the practice word correctly, if desired. In the described embodiment, if a user enters two or more words in quick succession in entry field 84, the CPU displays the candidate list for a recognized first word (ink object) while the word that was next entered is being recognized. Once the next word is recognized, the previous candidate list and associated word are then erased and the candidate list for the next word is displayed, and so on. The last-entered word and candidate list are continually displayed until the user taps the stylus in entry field 84 to enter new strokes.

Interface 80 also includes a word difficulty level selection to allow a user to select a particular type of word. When button 96 is selected by the user with stylus 38, a word that is typically easy to recognize by the recognizer is displayed as practice word 82. When button 98 is selected, a word that is typically recognized with difficulty by the recognizer is displayed as practice word 82. Words that are recognized with difficulty are stored in a special list; these are words which have combinations of letters which can be difficult to distinguish from other letters or combinations of letters.

In the example of FIG. 3b, the displayed practice word is "operate" and a user has entered the word "operate" 86 in all capital letters. The resulting candidate list 88 includes three candidates: "operate," with a confidence level of 91%, "operates," with a confidence level of 79%, and "operated," with a confidence level of 75%. Candidate word "operate" is displayed in boldface since it matches practice word 82. In this case, the topmost candidate word matched the practice word, so the handwritten word 86 was correctly recognized.

Figure 3C:
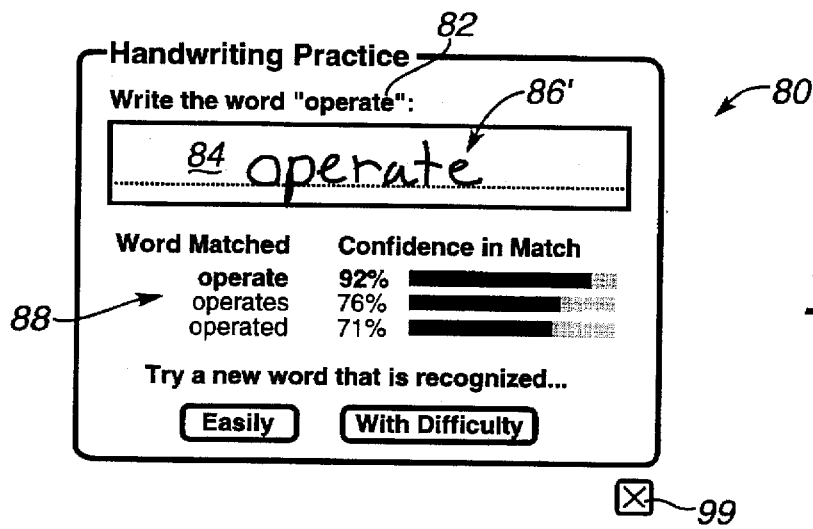
FIG. 3c is a portion of the display screen showing a lowercase written word in the handwriting training interface.

FIG. 3c is a diagrammatic illustration of handwriting practice interface 80 for a printed lowercase handwritten word 86'. Practice word 82 is again the word "operate," and the user has attempted to handwrite the word in entry field 84. The top three candidate words from the recognizer are listed in candidate list 88. The candidate word which corresponds to practice word 82 is displayed in boldface. Similar to the example shown in FIG. 3b, the top candidate word corresponds to practice word 82, indicating that handwritten word 86' was recognized correctly.

Figure 3D:
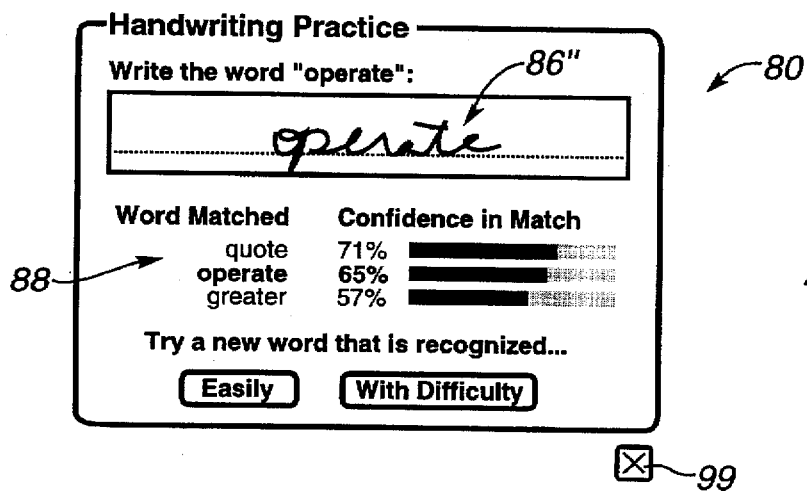
FIG. 3d is a portion of the display screen showing a cursive written word in the handwriting training interface.

FIG. 3d is a diagrammatic illustration of handwriting practice interface 80 for a cursive lowercase handwritten word 86". The user has entered the handwritten word 86 in an attempt to have word 86 recognized as the practice word "operate." Candidate list 88 shows three candidate words. The candidate word "operate," corresponding to the practice word, is listed second with a confidence of 65%. "Operate" is displayed in boldface to indicate that it corresponds to practice word 82. The candidate word "quote" is listed first with a confidence of 71%. The entered word 86" was thus misrecognized as "quote."

Figure 4:
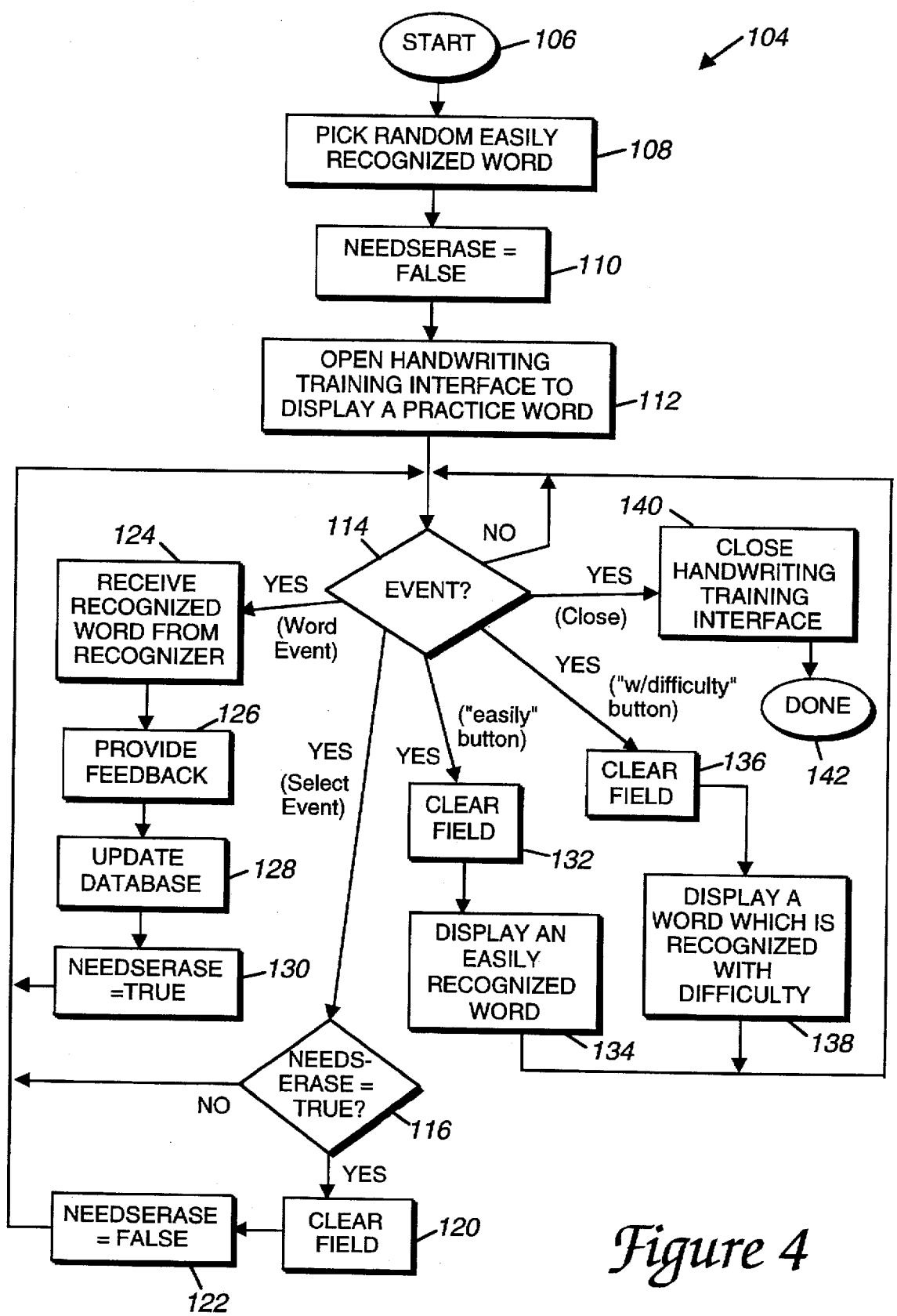
FIG. 4 is a flow diagram illustrating the method of the present invention.

FIG. 4 is a flow chart illustrating the method 104 of training a recognizer of a pen-based computer system of the present invention. The method begins at 106, and, in step 108, a random word is picked from the "easily recognized" list. This causes the initial practice word 82 displayed in the handwriting practice interface to be a word that is easily recognized by the recognizer (see step 134 below). In step 110, the variable NEEDSERASE, which determines if a handwritten word in entry field 84 should be erased, is set to "false." In next step 112, the handwriting training interface 80 is opened (displayed) and a practice word 82 is displayed. Initially, this practice word is the easy word picked in step 108.

In next step 114, the CPU checks if there is an "event." An "event," as used herein, refers to an input received by the CPU pertaining to the handwriting interface 80, where the input can be received from the user or the recognizer. Five main events which are handled by the handwriting interface 80 can take place: a user taps the stylus down in entry field 84 (a "select event"); a recognized word (candidate list) is received by the interface 80 from the recognizer (a "word event"); the "easily" button in interface 80 is selected by the user; the "with difficulty" button in interface 80 is selected by the user; and the close button is selected by the user. If there is no event in interface 80 and the user has not selected the interface to close, then the process continues waiting at step 114 until an event occurs or the interface is closed. User handwritten ink strokes which are entered in entry field 84 are preferably collected and sent to the recognizer by a concurrent background process which is detailed with respect to FIG. 4a.

If a select event takes place (the user taps stylus 38 in entry field 84 to enter ink strokes, for example), the process continues to step 116, wherein the CPU checks if the variable NEEDSERASE equals "true." If it is not true, the user is using the stylus to enter ink strokes in entry field 84. The ink is preferably collected and sent in the "background" process detailed in FIG. 4a, and process 104 does not know if handwritten ink is being entered by the user. Thus, if NEEDSERASE is not true, the process returns to step 114 to check for another event. If NEEDSERASE is equal to "true" in step 116, then, in step 120, entry field 84 is cleared so that all previous user-entered ink is erased. NEEDSERASE is "true" only after an entered word has been recognized, so that the select event indicates the user is entering a new word and that entry field should be cleared. In step 122, NEEDSERASE is set to "false" so that the entry field will not be cleared again until another word has been recognized. The process then returns to step 114 to wait for another event.

If a word event takes place in step 114, then step 124 is implemented, in which a recognized word (candidate list) is received from the recognizer. This word has been recognized and generated after sufficient ink has been received by the recognizer in the process of FIG. 4a. In the described embodiment, the recognizer formulates and returns a list of candidate words from a lexicon stored on a database and returns associated training data for each candidate word (described below). In step 126, the CPU provides feedback to the user. As shown in FIGS. 3b–3d, the feedback in the described embodiment takes the form of a displayed candidate list including all or some of the candidate words generated by the recognizer. The process of providing feedback is described in more detail with respect to FIG. 5.

After feedback has been provided in step 126, the CPU updates an appropriate recognition database in step 128 with the training data associating the ink entered by the user with the practice word. The stored training data allows the recognizer to recognize a particular user's handwriting more quickly and accurately, since characteristics of the user's handwriting, matched to known characters included in the practice words, can be utilized. The process of updating the database is described in greater detail with reference to FIG. 6. Once step 128 is complete, the process continues to step 130, in which the variable NEEDSERASE is set to "true." This causes the entry field 84 to be cleared when the user enters another select event in entry field 84.

In step 114, if the user selects the "easily" button to display a word that is recognized easily, then an "easily" event has occurred. The process continues to step 132, in which the entry field is cleared of all handwritten ink. In step 134, an easily recognized word is displayed as practice word 82. The process of retrieving and displaying an easily recognized word is described in greater detail with reference to FIG. 7. The process then returns to step 114.

In step 114, if the user has selected the "with difficulty" button to display a word that is recognized with difficulty, then a "w/difficulty" event has occurred. The process continues to step 136, in which the entry field is cleared of all handwritten ink. In step 138, a word which is recognized with difficulty is displayed as practice word 82. In the described embodiment, a difficult word is retrieved from a word list based upon a pointer's location. The pointer is set to point to an initial word in the difficult word list. When the difficult word is retrieved and displayed, the pointer is incremented to point to the next difficult word in the list.

The difficult word list includes common words which are known to cause recognition problems for the recognizer. Such words include words which look very similar to other words, especially when a user does not write the words carefully. For example, in the described embodiment, difficult words include "clue" and "due," since common mistakes made by users include writing a "c" and "l" closely to look like a "d," and vice versa. Similarly, words like "time" and "tune" may be confused, or "three" and "thru." There are about 100 to 150 words in the difficult list for the described embodiment. Other countries or regions may require a different list of words due to different conventions or frequency of words. For example, a user in Great Britain would use some words more commonly than a different user in the United States, and thus a slightly different difficult word list can be used. The contents of the difficult list can vary depending on the specific implementation of the recognizer being used.

In step 114, if a user selects the close box 99 or otherwise exits the handwriting training interface 80, then a "close" event has occurred. The process continues to step 140, in which the handwriting training interface is closed and removed from display screen 52. The process is then complete as indicated at 142.

Figure 4A:
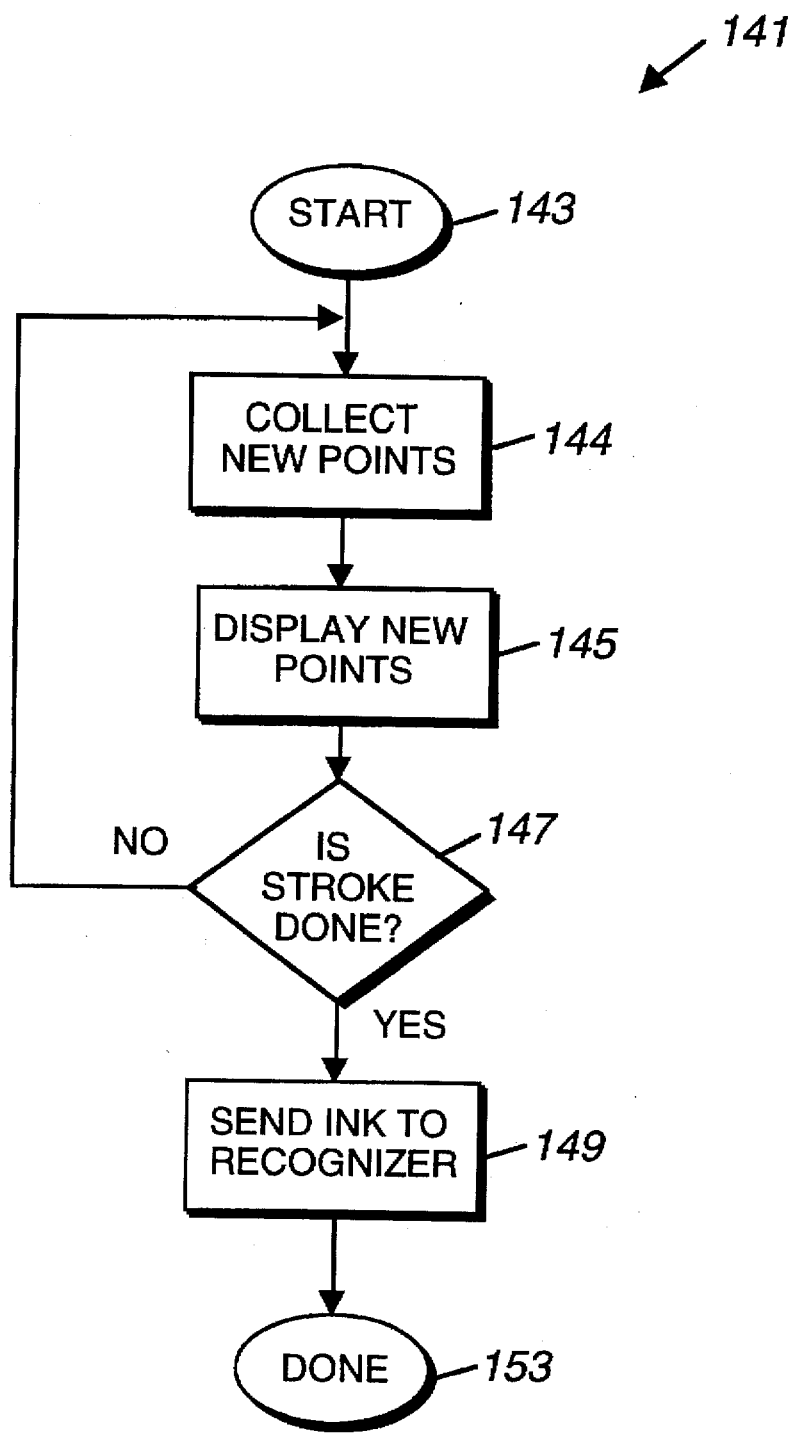
FIG. 4a is a flow diagram illustrating a method of collecting ink and sending ink to the recognizer.

FIG. 4a is a flow diagram of a method 141 for collecting and sending ink input by the user to the recognizer. The process begins at 143 and, in step 144, new ink points are collected from the user using well-known techniques. In the described embodiment, ink includes a number of ink points which describe the location of the strokes of ink. Ink is entered by the user when the user taps the stylus down on entry field 84 and moves the stylus across the screen 52. The entered ink points are displayed in step 145 at the locations where stylus 38 engages screen 52 as the strokes are being written. In step 147, the CPU checks if the current stroke is done, i.e. if the user has lifted the stylus from the screen. If not, more ink points are collected and displayed in steps 144 and 145. If the stroke is done, then step 149 is implemented, in which the collected ink stroke is sent to the recognizer, and the process is complete at 153.

The above process 141 is repeated while the user continues to enter strokes. The recognizer preferably attempts to recognize the entered ink strokes as an ink object when enough ink strokes have been entered to distinguish a word, or when a timeout or spaceout occurs. A timeout occurs when no additional ink strokes are entered for a predetermined length of time, and a spaceout occurs when the user enters ink strokes outside a predetermined range of pixels measured from the previously-entered ink or from entry field 84. The recognizer generates a candidate list of guesses and sends the list to the training interface process 104 as described above.

In the described embodiment, process 141 is a "background" system process, i.e. the process is implemented by the system concurrently with other processes running on pen-based computer system 10, such as process 104. For example, when a user enters ink strokes in entry field 84, the ink is collected in step 144 of FIG. 141 and is also concurrently detected as a select event in step 114 of FIG. 4. In alternate embodiments, the collection and sending of handwritten ink to the recognizer can be implemented in process 104 using similar steps to those described in FIG. 4a.

Figure 5:
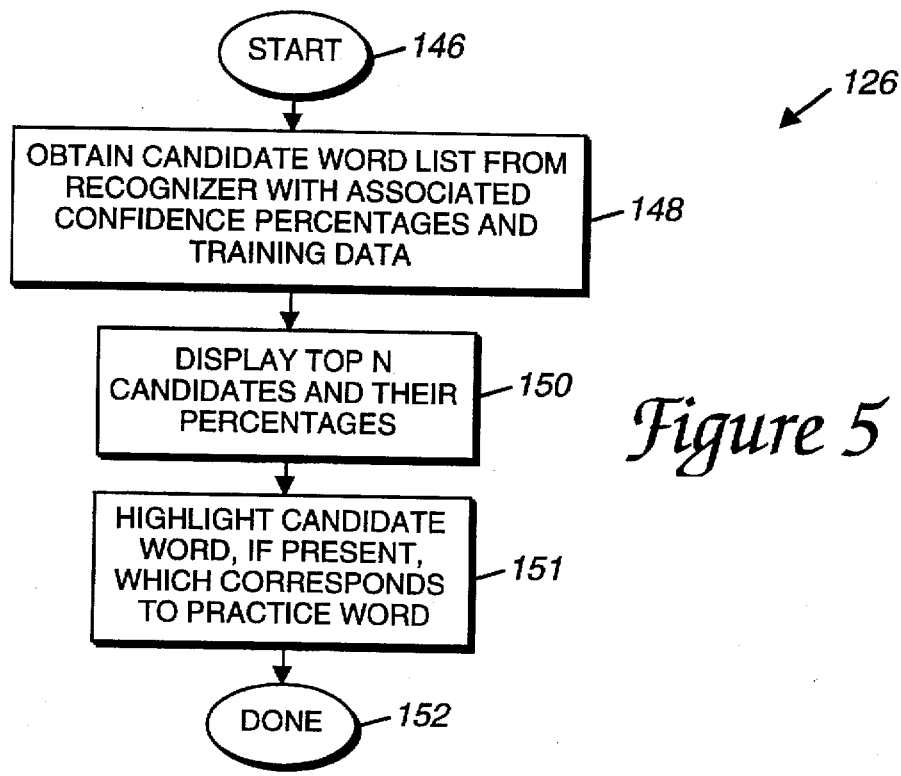
FIG. 5 is a flow diagram illustrating the step of providing feedback of FIG. 4.

FIG. 5 is a flow diagram of step 126 of FIG. 4, in which feedback is provided to the user after entered ink has been recognized and validated. The process begins at 146. In step 148, the CPU obtains a candidate word list from the recognizer, where each candidate word includes an associated confidence percentage and associated training data. The recognizer provides an amount of candidate words dependent on the specific implementation of the recognizer. For example, some recognizers may provide many candidate words, while others may only provide a short list of candidate words. The preferred recognizer for the present invention can provide from 1 to 10 words in a candidate list.

In step 150, the CPU displays the top N candidates and their percentages. In the described embodiment, as shown in FIGS. 3b–3d, N=3, so that the top three candidate words are displayed as well as the percentages and bar graphs associated with each of the candidate words. In alternate embodiments, other types of feedback can be provided to the user. For example, instead of displaying a candidate list, the CPU can simply display that the handwritten ink was correctly or incorrectly recognized (depending on if the candidate word having the greatest confidence level corresponds to the practice word). In other embodiments, audio sound effects from speaker 70 or other types of visual effects on display screen 52 can be used to display whether a word was correctly or incorrectly recognized. In step 151, the CPU highlights the candidate word, if present in the N displayed candidate words, which corresponds to practice word 82. In the described embodiment, the CPU displays the corresponding candidate word and its confidence level in boldface. This is to indicate to the user how confidently the recognizer matched handwritten word 86 to practice word 82. In an alternate embodiment, the CPU can always display the candidate word which corresponds to the practice word, even if that candidate word is not within the top N displayed candidate words. Once the candidate list has been displayed, the process is complete at 152.

Figure 6:
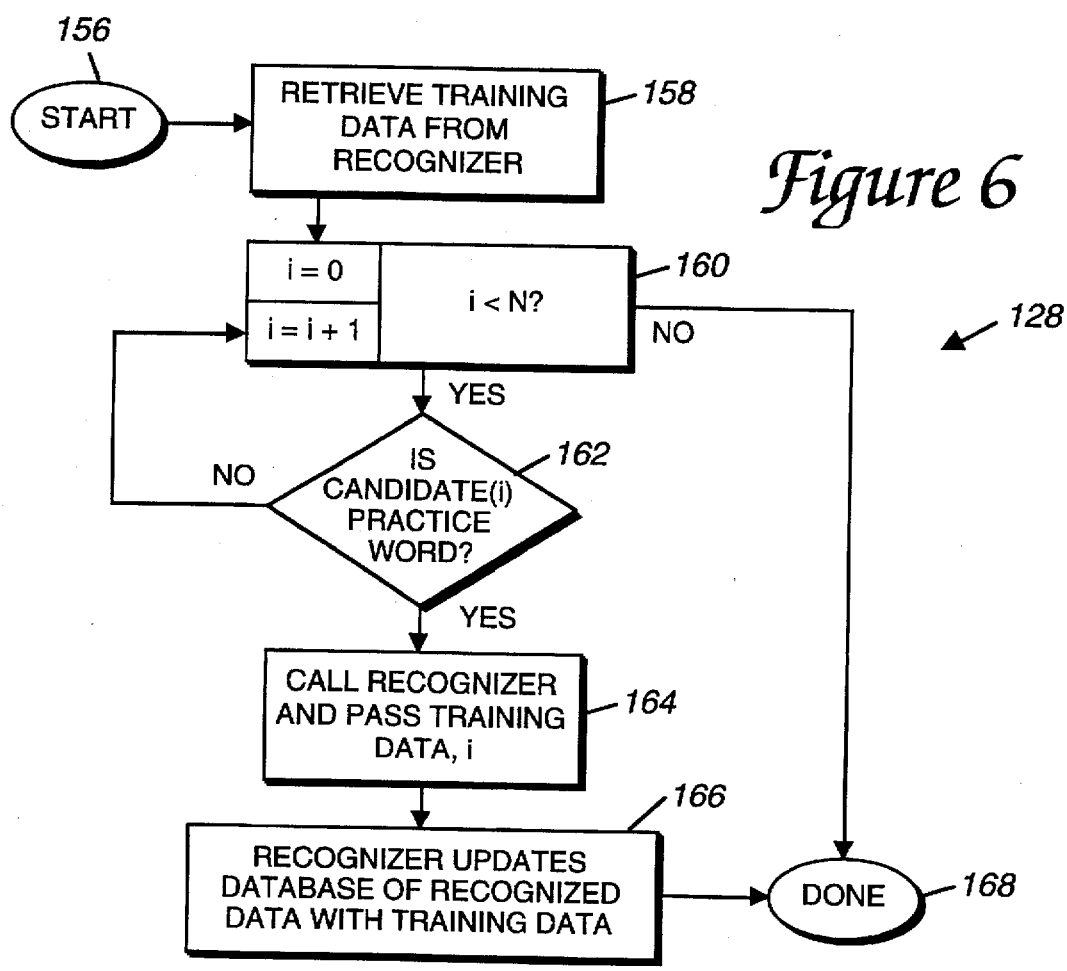
FIG. 6 is a flow diagram illustrating the step of updating the database of FIG. 4.

FIG. 6 is a flow diagram of step 128 of FIG. 4, in which a recognition database is updated with training information received from the recognizer and derived from the user's handwritten input. The process begins at step 156, and, in step 158, training data for each candidate word is received by the CPU from the recognizer, as described above in step 148 of FIG. 5. Training data includes information which matches the ink strokes to a recognized word or parts (such as characters) of a word, such as the provided practice word or a word in a lexicon. The matching of ink strokes to parts of a recognized word helps the recognizer recognize similar ink strokes entered by the user following the matched ink strokes. For example, a user enters the handwritten word "operate" in entry field 84 in response to a displayed practice word. A number of common letter shapes for each letter of the alphabet is stored by the CPU on a database. Each letter of the word "operate" is assigned a letter shape which it most resembles. For example, the letter "o" can be assigned "o" shape #2, which it resembles. The training data, generated by the recognizer, describes which letter shapes were used in the practice word. Thus, the training data could state that the word "operate" includes "o" shape #2, "p" shape #5, "e" shape #1, etc. The recognizer could then bias its recognition towards these chosen letter shapes when recognizing further handwritten words entered by the user. Parts or features of handwritten words smaller than letters can also be used to derive training data, such as features of letters. The specific contents of training data can vary depending on the particular recognizer implementation being used, as is well-known to those skilled in the art.

In the described embodiment, the training database can be associated with a particular user. A separate training database can be provided and used for each separate user. If "guest mode" is selected as shown with reference to FIG. 3a, then a training database for the guest user is used to recognize the guest user's handwriting and is updated by training data. If "primary user" mode is being used, then a training database associated with the primary user is used to recognize the primary user's handwriting and is updated by training data. In other embodiments, additional users can be provided their own associated training databases. Guest mode and user mode are described in greater detail in the abovementioned co-pending patent application Ser. No. 08/282,785 entitled, "Method and Apparatus for Recognizing Handwriting of Different Users of a Pen-Based Computer System" and filed on an even day herewith.

In step 160, counter variable "i" is set to zero and i is compared to N, which is the number of candidate words displayed in the candidate list. Alternatively, N can be the total number of candidate words generated by the recognizer. If "i" is less than N, then step 162 is implemented, in which the CPU checks if candidate(i) (the ith candidate word) corresponds to the practice word. If not, the process returns to step 160 to increment "i" and compare the next candidate word. If candidate(i) does correspond to the practice word, then the process continues to step 164, in which the recognizer is called and the training data associated with candidate(i) and the value of "i" are passed to the recognizer. Thus the information which matches the ink entered by the user to a candidate word from the lexicon is associated with the matched candidate word and returned to the recognizer. In next step 166, the recognizer updates the appropriate training database of recognized data with the training data. The recognizer knows the identity of the letters or features of the letters by referring to the letters of the matched candidate word, and, in the training data, can associate shapes of the handwritten ink with letters, as described above. The recognizer stores the training data in a training database so that it may be retrieved and used to more accurately recognize further ink objects entered by the user. The process is then complete as indicated at 168.

Figure 7:
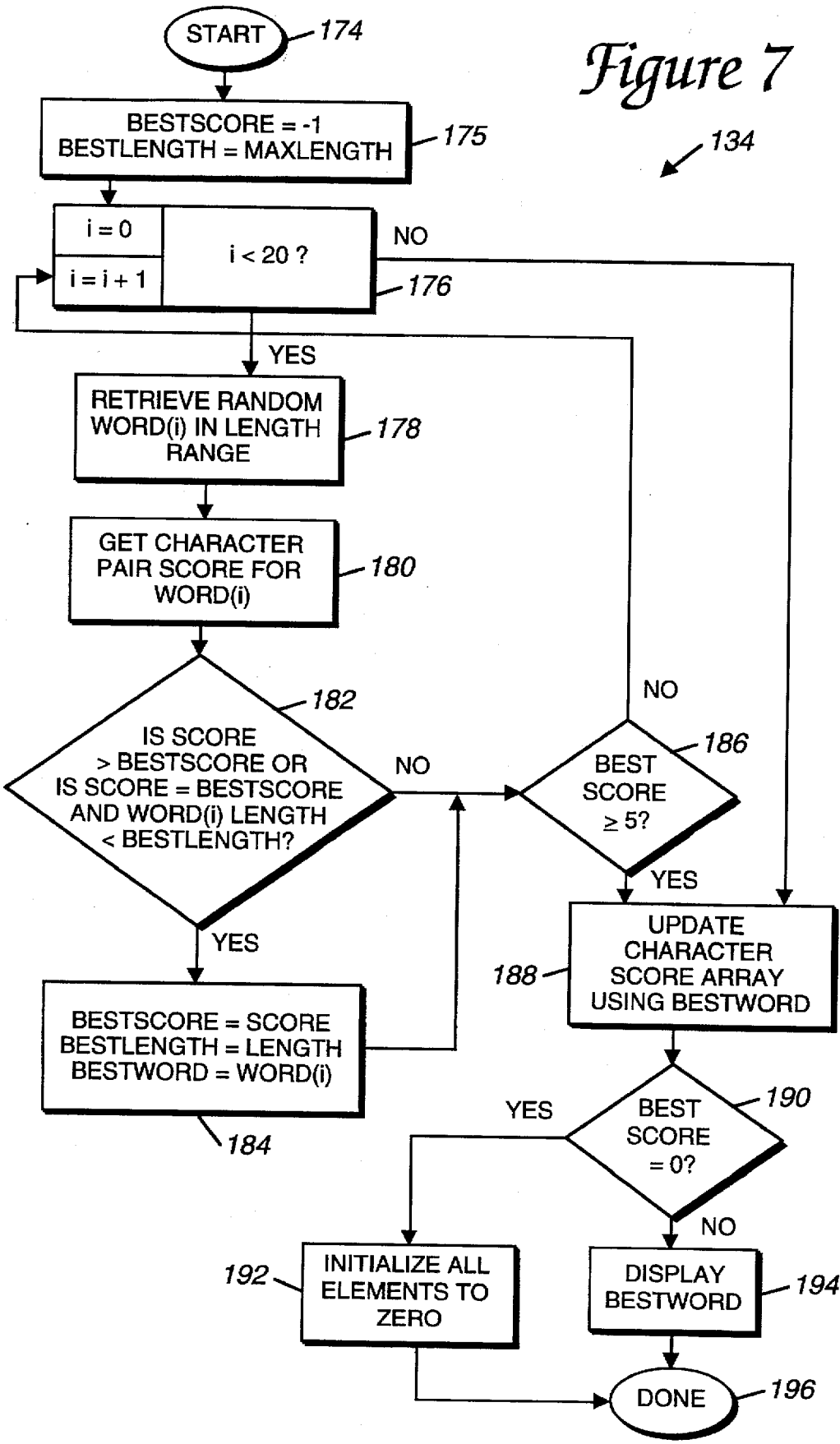
FIG. 7 is a flow diagram illustrating the step of displaying an easily recognized word of FIG. 4.

FIG. 7 is a flow chart describing the step 134 of FIG. 4 of displaying an easily recognized word. The process of the present invention provides a random easily-recognized practice word to a user having a reasonable length and a variety of pairs of characters so that the user can enter many different types and different combinations of characters to be used for training data. The process begins at 174, and, in step 175, the variable BESTSCORE is set equal to −1 and the variable BESTLENGTH is set equal to MAXLENGTH, which is the maximum length allowed for a practice word. BESTSCORE and BESTLENGTH are variables used in the present process to keep track of the highest SCORE and most appropriate word length, respectively, of random words retrieved from the database. In step 176, a counter variable "i" is initialized to zero. Variable "i" is compared to 20, which is the number of words which are to be randomly retrieved and analyzed; one of these words will be the displayed easily-recognized practice word 82. If "i" is less than 20, then step 178 is implemented, in which a random word WORD(i) within the length range is retrieved from a database of characters. The length range of a "easy" practice word can vary depending on the desired complexity of the word; a typical length range in the described embodiment is 3–7 characters. The database of characters includes a dictionary tree from which the characters of the practice word are retrieved. Step 178 is described in greater detail with respect to FIG. 8.

In step 180, a character pair score for WORD(i) is calculated and stored in memory as the variable SCORE. The SCORE of a word indicates how valid the word is as a practice word depending on certain conditions, and is described in greater detail with respect to FIG. 9. In next step 182, the CPU checks if the calculated SCORE for the current WORD(i) is greater than the BESTSCORE, or if SCORE is equal to the BESTSCORE and the length of WORD(i) is less than BESTLENGTH. If the conditions of step 182 are not met, the process continues to step 186 (described below). If the conditions of step 182 are met, the process continues to step 184, in which BESTSCORE is set equal to SCORE, BESTLENGTH is set equal to LENGTH (the length of WORD(i) in characters), and BESTWORD is set equal to WORD(i). The process then continues to step 186.

In step 186, BESTSCORE is compared to 5, a threshold number that assures that the selected word has an acceptably high number of new (non-repeating) character pairs. If BESTSCORE is less than 5, then the word does not have enough new character pairs, and the process returns to step 176, where "i" is incremented so that another random word can be retrieved. If BESTSCORE is greater than or equal to 5, then the process continues to step 188, in which the character score array is updated using BESTWORD. The character score array is used to remember which character pairs have been used before, and is described with reference to FIG. 9a. Step 188 is described in greater detail with reference to FIG. 10. In next step 190, BESTSCORE is compared to zero. If BESTSCORE is equal to zero, step 192 is implemented, in which all elements are initialized to zero. This means that none of the randomly-retrieved words had any new character pairs in them, so the character selection process should start over. The process is then complete at 196. If BESTSCORE is not equal to zero in step 190, then step 194 is implemented, in which BESTWORD is displayed in handwriting practice interface 80 as practice word 82. The process is then complete at 196.

Figure 8:
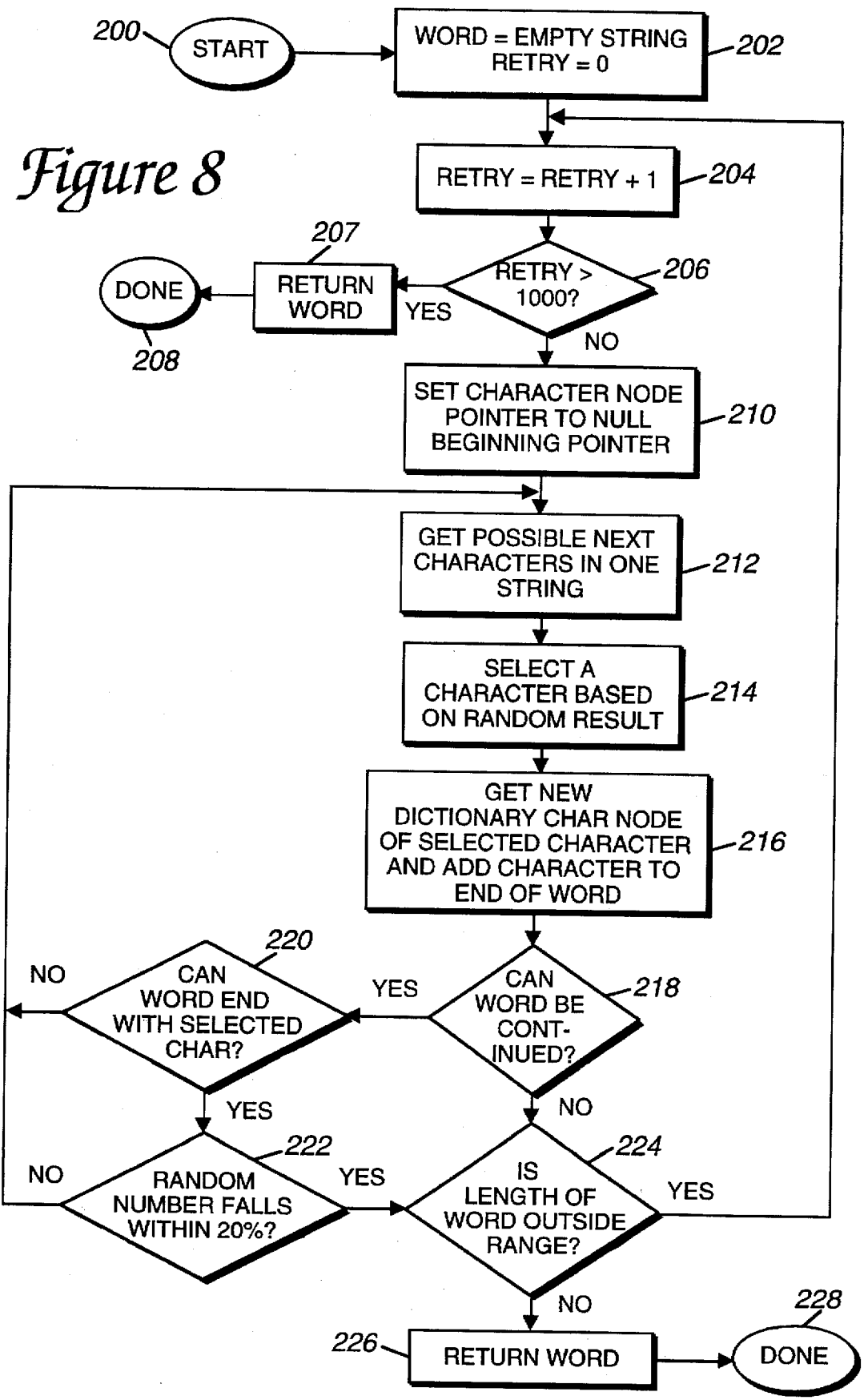
FIG. 8 is a flow diagram illustrating the step of retrieving a random word of FIG. 7.

FIG. 8 is a flow diagram describing step 178 of FIG. 7 in which a random WORD(i) is retrieved in a specified length range. The process begins at 200. In step 202, the word string is initialized to an empty string and the variable RETRY is initialized to zero. In step 204, the variable RETRY is incremented. In step 206, the CPU checks if RETRY is greater than 1000. If it is, then the process returns the word (as an empty string) in step 207 and is complete at step 208, i.e., if after 1000 tries, no practice word is obtained having the correct requirements, then the process stops looking for a practice word. If RETRY is not greater than 1000, then the process continues to step 210. In step 210, the character node pointer is set to a null beginning pointer at the beginning of a dictionary tree of characters stored in a database. In next step 212, the possible next characters which can follow the current node in the dictionary tree are retrieved and put into a string. For example, there may be a number of possible next characters which can follow an "a" character in a word. Possible next characters are arranged in a dictionary tree structure (described below with respect to FIG. 8a) which are linked to the preceding character by pointers. All of the possible next characters for a current node are retrieved and arranged in a string. In step 214, a character of the string is selected based upon a random result. For example, a random number generator can generate a random number which corresponds to one of the characters in the string. Each character can be assigned an individual probability which can vary depending on the character. For example, a "t" character can be assigned a much higher probability than a "z" character so it will be selected more often. One way to assign probabilities is to assign a certain range of numbers to a character. For example, to give a "t" a higher probability of being selected, ten numbers 81–90 can be assigned to the "t." A "z" character, having a low probability, can be assigned only one number, 100. The random number generator can then be instructed to generate a random number between 1 and 100, and the character associated with the generated number is selected. In other embodiments, probabilities and selections can be made of character combinations. For example, character pairs or triplets can be assigned probabilities and be selected.

In next step 216, the CPU gets the new dictionary character node of the selected character in the dictionary tree and adds the selected character to the end of the current word. That is, the node of the character that is randomly selected from the string becomes the current node. In step 218, the CPU checks if the word formed by the retrieved characters can be continued with more characters. In the described embodiment, this is accomplished by checking flags (or the equivalent) of the current character node. Each node can include two flags, a continuation flag and a termination flag. If the continuation flag is set, it indicates that another character can follow the current character (i.e., the current word can continue past the current character). If the termination flag is set, it indicates that the current character can be used as the last character in the word. At least one of the flags must be set for every character node in the dictionary tree. By examining the continuation flag of the current character node, the CPU can determine if the word can be continued. If the word can be continued, then step 220 is implemented. If the word cannot be continued, then step 224 is implemented.

In step 220, the CPU checks if the word can end with the current, selected character. This is accomplished by checking the termination flag of the current character node. If the word cannot end with the current character, then the process returns to step 212 to get another character. If the word can end with the current character, then step 222 is implemented. In step 222, the CPU checks if a randomly generated number falls within a 20 percentile. This check is performed to provide an element of randomness in the determination whether a word should be terminated at the current character. If the number is not within 20%, step 212 is implemented to add another character to the word. If the number is within 20%, step 224 is implemented. In step 224, the CPU checks if the length of the current string of characters is outside a predetermined word length range. In the described embodiment, this word length range is 3–7 characters. If the length of the word is outside the range, the process loops back to step 204 to increment the variable RETRY. If the length of the word is not outside the range, then step 226 is implemented, in which the word is returned to the main process of FIG. 7 so that the word can be displayed in interface 80 as the practice word 82. The process is then complete at 228.

Figures 8A, 9A:
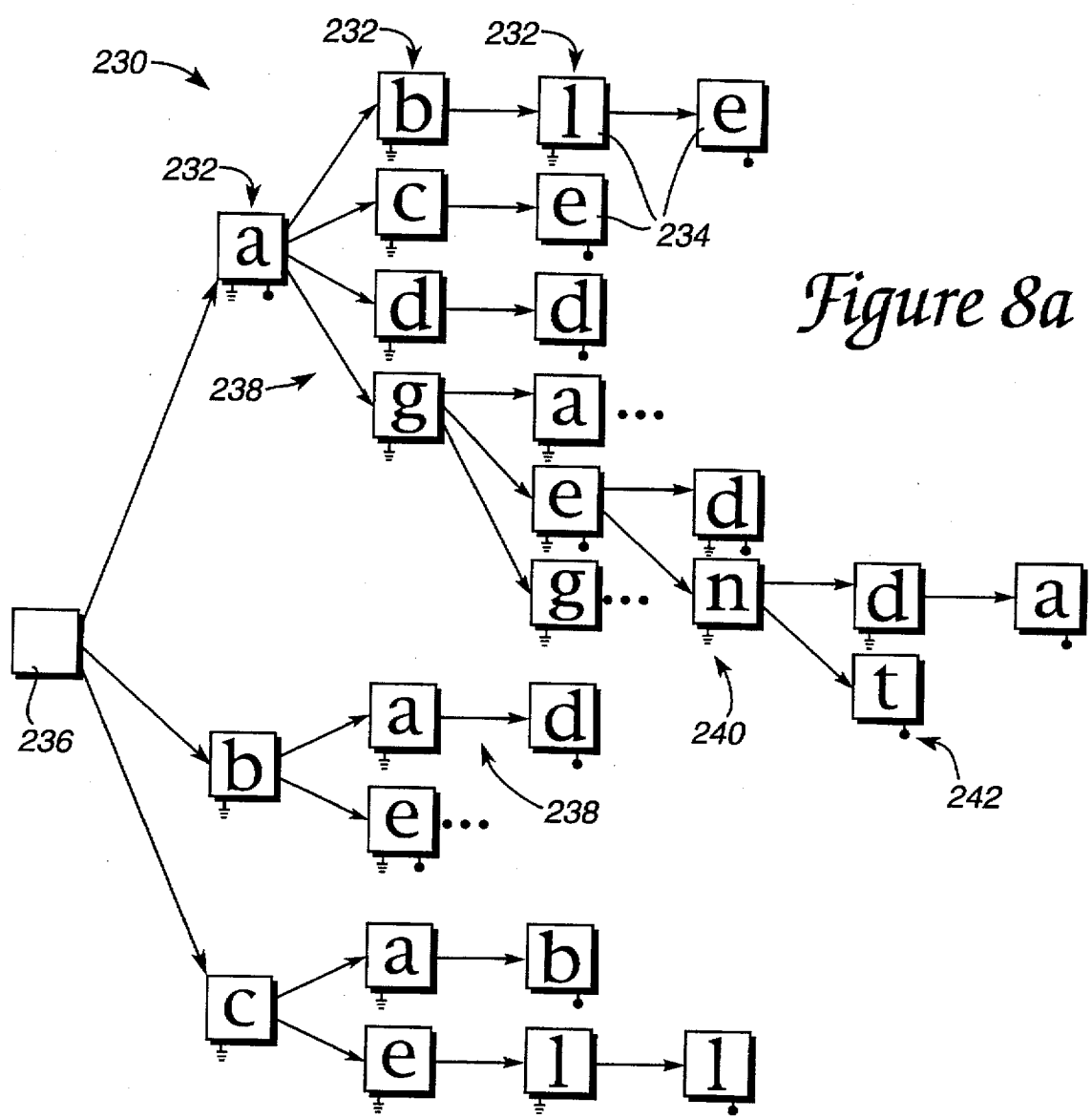
FIG. 8a is a diagrammatic illustration of a dictionary character tree used in the present invention.
FIG. 9a is a diagrammatic representation of a character score array used in the present invention.

FIG. 8a is a diagrammatic illustration of a portion of a dictionary character tree 230 suitable for use in the present invention for retrieving a random word that is "easily recognized." A large dictionary tree includes thousands or tens of thousands of nodes interconnected in possible word patterns as is well known to those skilled in the art. A possible implementation of a dictionary tree is described in greater detail in U.S. Pat. No. 4,704,703 entitled "Dynamic Input Processing System," by D. Fenwick, issued on Nov. 3, 1987, which is hereby incorporated by reference herein. Tree 230 includes several levels 232 of character nodes 234. A node 236 is the root node at the first level. Node 236 points to all possible first characters for words which can be derived from the dictionary tree. In the example of FIG. 8a, only three starting character nodes ( "a," "b," and "c") are shown for the purposes of illustration. In an actual embodiment, all twenty-six letters of the alphabet would normally be included as twenty-six second level character nodes.

From each character node, a number of pointers 238 point to the possible next characters which may follow the character in a word. For example, the characters "b," "c," "d," and "g," may follow the "a" character node in FIG. 8a. Using the characters shown, words such as "add," "age," "agenda," and "agent" can be retrieved from tree 230. As described above, each character node includes two flags, a continuation flag and a termination flag. If the continuation flag is set for a particular character node, the flag symbol 240 is shown connected to that character node. Similarly, if the termination flag is set for a node, flag symbol 242 is shown connected to that node. Some characters have only one of the flag set, while others have both flags set. The flags do not have to be explicit flags or memory locations; for example, a "continuation flag" of a node can be interpreted as being set if the node points to another node.

Figure 9:
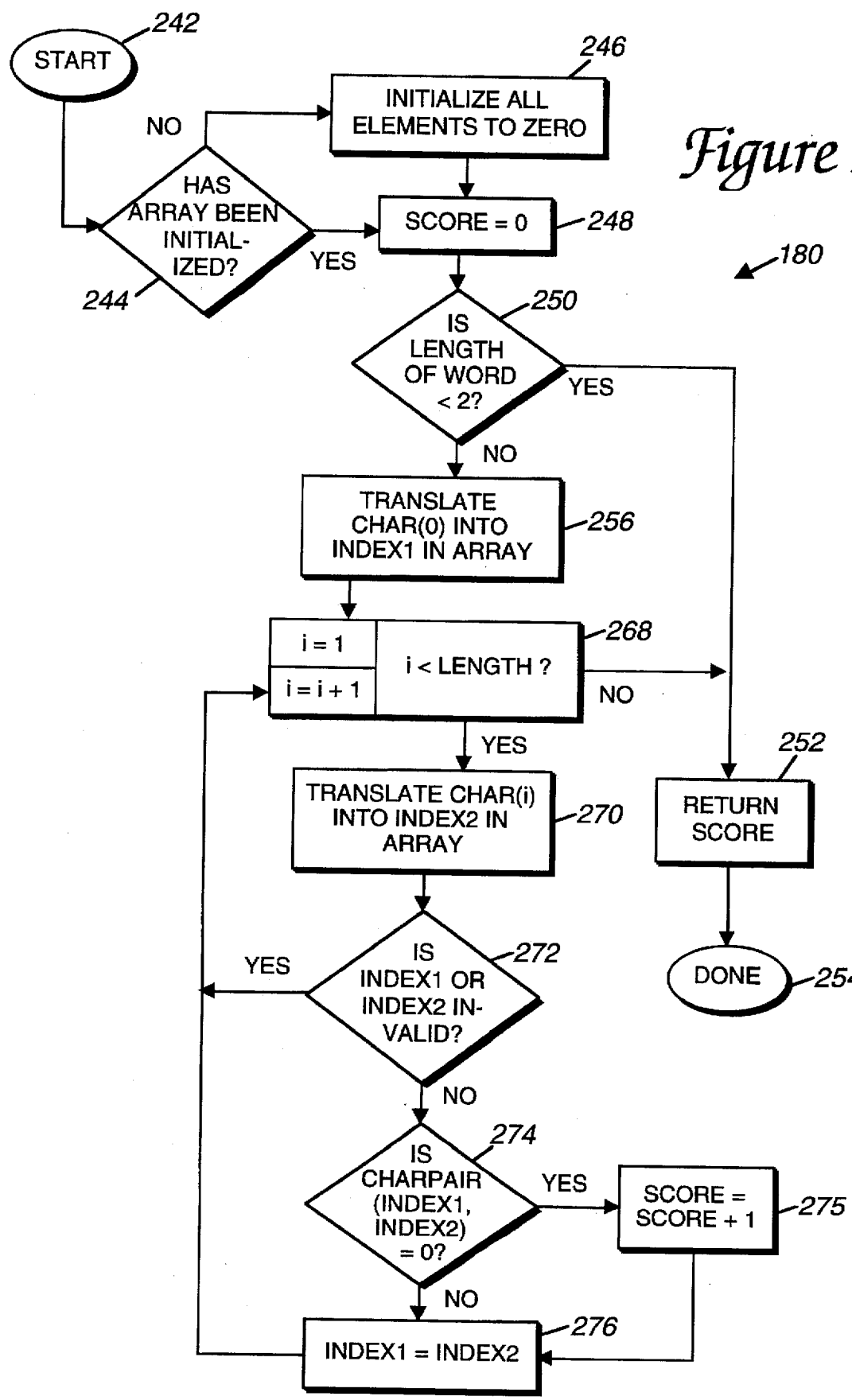
FIG. 9 is a flow diagram illustrating the step of getting a character pair score for a word as shown in FIG. 7.

FIG. 9 is a flow diagram for a process describing step 180 of FIG. 7, in which a letter pair score for WORD(i) is retrieved. The process begins at 242, and in step 244, the CPU checks if the scoring array has been initialized. The scoring array is used to check if a character pair is used within the current word. If the array has not been initialized, then step 246 is implemented to initialize all elements of the array to zero. After step 246, or if the array has been initialized in step 244, step 248 is implemented, in which the variable SCORE is initialized to zero. In step 250, the CPU checks if the length of the word, in characters, is less than two. If so, the word contains no character pairs and thus has a SCORE of 0. Step 252 is then implemented, in which SCORE (which is equal to zero) is returned to the process of FIG. 7. The process is then complete as indicated at 254.

If the length of the word is not less than two in step 250, then the process continues to step 256, where CHAR(O), the first character of the word, is translated into INDEX1 of the scoring array. FIG. 9a is a diagrammatic illustration of the scoring array 260, implemented in memory such as RAM 16. The single characters 262 on the left of the table are possible values of INDEX1, and the single characters 264 on the top of the table are possible values of INDEX2. A full table would include a row and column for each letter in the alphabet used (i.e., twenty-six for the English alphabet). Each cell 266 of the array is referenced by a character pair composed of the characters heading the column and row which intersect at that cell. Thus, a cell for the character pair "ab" is found by locating the intersection between the "a" row and the "b" column. In each cell 266, a number is stored indicating if that character pair has been used already. In the described embodiment, the table is initialized with a zero in every cell 266. When a character pair is used, the number in the cell corresponding to the character pair is incremented in an updating step.

Referring back to FIG. 9, in step 268, a counter variable "i" is initialized to one and "i" is compared to the length of the word. If "i" is less than the word length, then step 270 is implemented, in which CHAR(i) is translated into INDEX2 of the score array 260. In next step 272, the CPU checks if INDEX1 or INDEX2 is invalid. In the described embodiment, if both indexes are not a letter from A–Z (upper or lowercase), then no score is generated for that pair. If either index is invalid, the process returns to step 268 to increment "i." If neither index is invalid, then the process continues to step 274, where the CPU checks if CHARPAIR (INDEX1, INDEX2) equals zero, i.e., if the cell located by INDEX1 and INDEX2 holds a zero. If so, then step 275 is implemented to increment SCORE. After step 275, or if the cell located in step 274 does not equal zero, then the process continues to step 276, where INDEX1 is set to the value of INDEX2. The process then returns to step 268 to increment "i" and compare "i" to the word length. Once "i" is greater than or equal to the length, then SCORE is returned to the process of FIG. 7 and the process is complete at 264.

Figure 10:
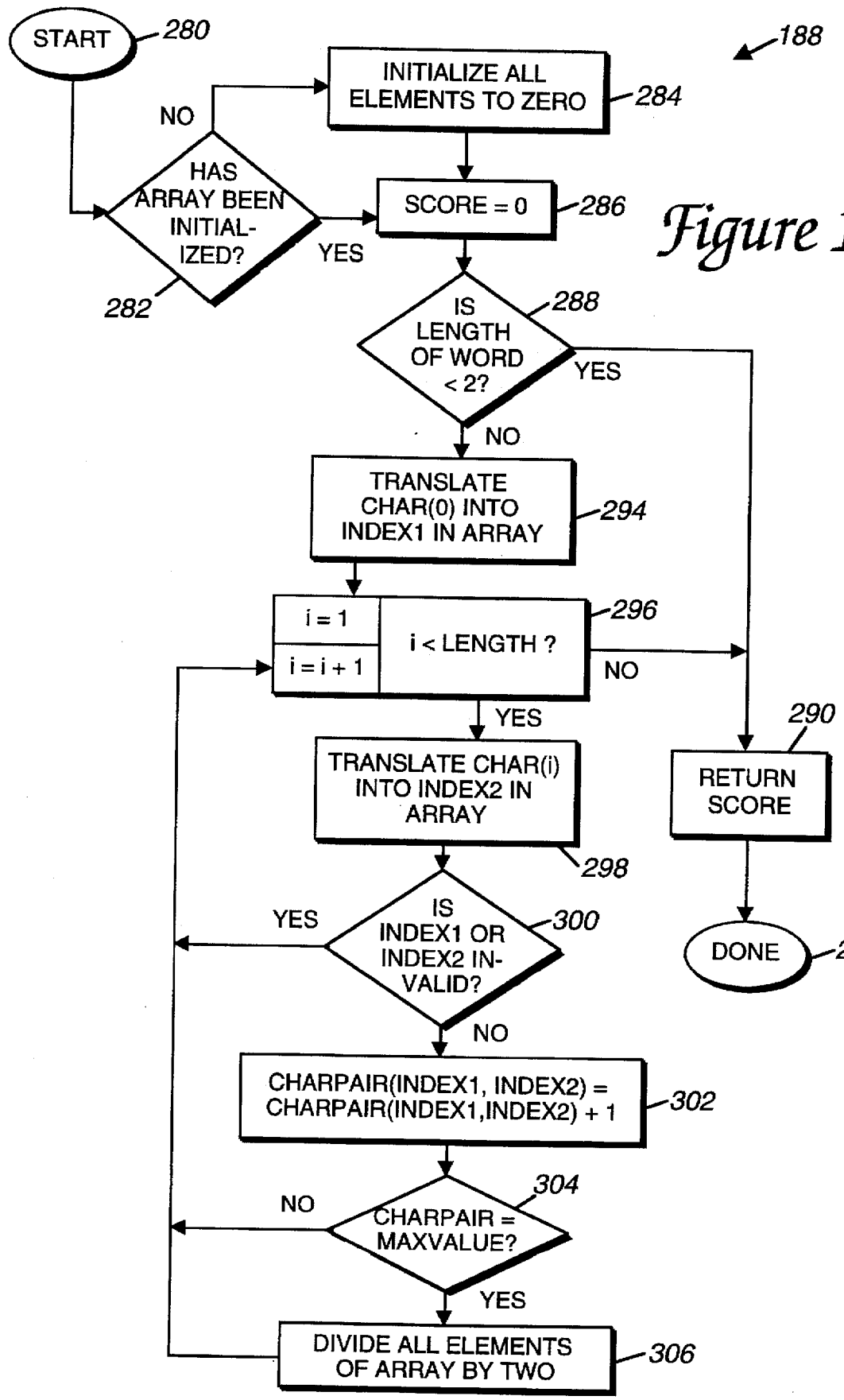
FIG. 10 is a flow diagram illustrating the step of updating a character score array of FIG. 7.

FIG. 10 is a flow diagram for a process describing step 188 of FIG. 7, in which the character score array is updated using BESTWORD. Steps 280–300 of FIG. 10 are the similar top steps 232–252 of FIG. 9 and are described with reference to that Figure. In step 302, CHARPAIR(INDEX1, INDEX2), i.e., the value in the indexed cell, is incremented. In step 304, the CPU checks if CHARPAIR is equal to a maximum value, which, in the described embodiment, is 255. This check is used to prevent a maximum number from being incremented so that it is reset to zero. If CHARPAIR is not equal to the maximum value, then the process returns to step 296 to increment "i." If CHARPAIR is equal to the maximum value, all elements of the scoring array are divided by two in step 306, and the process returns to step 296 to increment "i." Alternatively, all the elements of the array can be set to a number less than MAXVALUE, such as 1, rather than being divided by two. When "i" is greater than or equal to the length of the word in step 296, the character pairs have all been analyzed. Step 290 is implemented to return SCORE and the process is complete as indicated at 292.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for training a recognizer of a pen-based computer system, the method comprising the steps of:

having a pen-based computer system display a practice word on a display screen of said pen-based computer, said practice word being easily recognized accurately by said recognizer when entered as a handwritten word by a user, said easily recognized practice word being displayed when an indication from said user is received to display a practice word that is easily recognized;

having a user of said pen-based computer system enter a first handwritten word that said user desires to be recognized as said practice word into said pen-based computer system using a stylus;

obtaining a recognized candidate list from a recognizer, said candidate list being derived from said first handwritten word and including a plurality of candidate words and an associated confidence level for each of said plurality of candidate words, said confidence level indicating how confidently said first handwritten word has been matched to said associated candidate word, wherein each of said candidate words includes a sequence of a plurality of characters, wherein each of said candidate words has a different recognized meaning from all other candidate words in said candidate list, and wherein each of said candidate words includes a different number, sequence, or identity of characters from said other candidate words;

displaying said candidate list including said plurality of candidate words and said associated confidence levels on said display screen of said pen-based computer system, said candidate words being displayed in an order from the most confidently recognized candidate word to the least confidently recognized candidate word; and updating a training database with training data derived from said first handwritten word such that when a second handwritten word is entered, said training data may be utilized to recognize said second handwritten word with greater accuracy.

2. A method for training a recognizer of a pen-based computer system, the method comprising the steps of:

receiving a selection from a user indicating that a practice word be a word that is easily recognized by said pen based computer when entered as a handwritten word by said user;

displaying said practice word on a display screen of said pen-based computer;

receiving a first handwritten word entered by said user into said pen-based computer system using a stylus, said user desiring said handwritten word to be recognized as said practice word;

obtaining a recognized candidate list from a recognizer, said candidate list being derived from said first handwritten word and including a plurality of candidate words and an associated confidence level for each of said plurality of candidate words, said confidence level indicating how confidently said first handwritten word has been matched to said associated candidate word;

displaying said candidate list including said plurality of candidate words and said associated confidence levels on said display screen of said pen-based computer system; and updating a training database with training data associated with a candidate word that corresponds to said practice word such that when a second handwritten word is entered, said training data may be utilized to recognize said second handwritten word with greater accuracy.

3. A method as recited in claim 1 wherein only the candidate word, if present in said candidate list, which corresponds to said practice word is visually distinguished from other candidate words in said candidate list to indicate the position of said corresponding candidate word in said order of candidate words.

4. A method as recited in claim 1 wherein said step of displaying a practice word that is easily recognized includes retrieving a random word from a dictionary tree.

5. A method as recited in claim 4 wherein said step of displaying a practice word that is easily recognized includes retrieving a plurality of random words from said dictionary tree and selecting one of said random words to be said practice word.

6. A method as recited in claim 1 wherein said step of displaying a practice word includes displaying a practice word that is recognized accurately with difficulty by said recognizer when said practice word is entered as a handwritten word by said user and when said practice word is selected by said user to be a difficult practice word.

7. A method as recited in claim 6 wherein said step of displaying a word recognized with difficulty includes selecting a random word from a predetermined list of difficult words.

8. A method as recited in claim 1 wherein said step of entering a first handwritten word includes entering said first handwritten word on a display screen of said pen-based computer system with a stylus.

9. A method as recited in claim 8 wherein said step of obtaining a recognized candidate list from a recognizer includes obtaining training data associated with each candidate word.

10. A method as recited in claim 8 wherein said step of displaying said candidate list includes displaying only a predetermined number of candidate words having the highest confidence levels generated by said recognizer.

11. A method as recited in claim 2 wherein said step of displaying a practice word that is easily recognized includes retrieving a random word from a dictionary tree.

12. A method as recited in claim 9 wherein said step of updating a training database includes saving said training data associated with said candidate word which matches said practice word such that said practice word is associated with said training data.

13. A method as recited in claim 1 wherein said step of updating a training database includes saving training data which describes portions of said first handwritten word which match said practice word.

14. A method as recited in claim 10 wherein said practice word and said first handwritten word are comprised of characters, and wherein said step of updating a training database includes associating characters included in said first handwritten word with corresponding characters of said practice word.

15. A method as recited in claim 1 wherein said step of updating a training database includes updating a training database associated with a user of said pen-based computer system, wherein said training database is one of a plurality of training databases.

16. A pen-based computer system comprising:

a digital processor;

read/write memory coupled to said digital processor;

a display screen coupled to said digital processor;

a pointing device coupled to said digital processor, said pointing device being operative to enter a first ink object into said computer system;

means for displaying a practice word on said display screen, said practice word being accurately recognized with difficulty by said pen-based computer system when entered by a user as said first ink object, said difficult practice word being displayed when an indication from said user is received to display a practice word that is recognized with difficulty;

a recognizer implemented by said digital processor for analyzing said first ink object and providing a recognized candidate list, said candidate list including a plurality of candidate words and an associated confidence level for each of said plurality of candidate words, said confidence level indicating how closely said first ink object matches said associated candidate word, wherein said candidate list is displayed on said display screen such that the candidate word corresponding to said practice word, if present in said candidate list, is visually distinguished from other candidate words not corresponding to said practice word; and means for updating a training database with training data derived from said first ink object such that when a second ink object is entered, said training data is utilized to recognize said second ink object more accurately, wherein said means for updating is implemented by said digital processor.

17. A pen-based computer system as recited in claim 16 wherein said pointing device is a stylus operative to engage said display screen to enter said first and second ink objects into said computer system.

18. A pen-based computer system as recited in claim 16 further comprising means for displaying a practice word that is easily recognized accurately by said recognizer when handwritten by a user, said easily recognized practice word being displayed when said user designates said practice word to be an easily recognized practice word.

19. A pen-based computer system as recited in claim 18 wherein said means for displaying a practice word that is easily recognized includes means for retrieving a plurality of random words from said dictionary tree and means for selecting one of said random words to be said practice word.

20. A pen-based computer system as recited in claim 19 wherein said means for displaying a practice word includes means for displaying a practice word that is accurately recognized with difficulty by said recognizer when handwritten by a user, said difficult practice word being displayed when said user designates said practice word to be an easily recognized practice word.

21. A pen-based computer system as recited in claim 1 wherein said means for displaying a practice word recognized with difficulty includes means for selecting a random word from a predetermined list of difficult words.

22. A pen-based computer system as recited in claim 16 further comprising means for displaying a predetermined number of candidate words from said candidate list provided by said recognizer.

23. A pen-based computer system as recited in claim 16 wherein said means for updating a training database includes means for saving training data which describes said first handwritten word such that said practice word is associated with said training data.

24. A method for providing an easily recognized practice word to a user of a pen-based computer system who desires to handwrite an ink word that can be easily recognized accurately as said practice word, the method comprising:

receiving input from said user indicating that said user has selected a practice word that is easily recognized when input as a handwritten word to said pen computer system;

retrieving a plurality of random words from a dictionary tree of characters, wherein each of said random words includes a plurality of characters;

calculating a word score for each of said random words based on the number of pairs of characters included in each of said random words; and selecting a random word having the highest word score for said plurality of random words as said practice word for a user of a pen-based computer system, said user intending to handwrite an ink word that will be accurately and easily recognized as said selected practice word.

25. A method as recited in claim 24 wherein said step of retrieving a plurality of random words includes randomly selecting one of a plurality of possible next characters from said tree.

26. A method as recited in claim 25 wherein a retrieved random word is not used as said practice word if said retrieved word includes a number of characters outside a predetermined range of characters.

27. A method as recited in claim 26 wherein each character in said tree includes an indicator indicating if said character can be used to terminate said random word, and wherein said random word is terminated at a character when said character includes said terminator and a randomly generated number falls within a predetermined threshold.

28. A method as recited in claim 25 wherein said step of calculating a word score includes incrementing said word score of a random word when a pair of characters in said random word has not already been used in said random word.

29. A method as recited in claim 28 further comprising a step of incrementing a pair number for each pair of characters used in said random word, said pair number being stored in an array of character pairs, wherein said word score is incremented for each character pair in said random word having a pair number that has not been previously incremented.

30. A method as recited in claim 24 further comprising a step of displaying said practice word on a display screen of said pen-based computer system.

31. A method as recited in claim 30 further comprising a step of displaying an entry field in which said user writes a handwritten ink word with a stylus, said handwritten ink word being intended to represent said practice word.

32. A method as recited in claim 31 further comprising a step of recognizing said handwritten ink word and displaying an indication of how closely said handwritten ink word corresponds to said practice word.

33. A computer readable medium containing program instructions for training a recognizer, the program instructions performing the steps comprising:

receiving an indication from a user to display either a practice word that is easily recognized accurately when entered as a handwritten ink word, or a practice word that is accurately recognized with difficulty when entered as a handwritten ink word;

displaying a practice word on a display screen of said pen-based computer system corresponding to said indication;

receiving a first handwritten ink word from said user of said pen-based computer system, wherein said user desires said first handwritten ink word to be recognized as said practice word;

providing said first handwritten ink work to a recognizer and obtaining a recognized candidate list from said recognizer, said candidate list including a plurality of candidate words that are possible matches to said handwritten ink word, wherein each of said candidate words includes a plurality of characters, said candidate list also including an associated confidence level for each of said candidate words that indicates how confidently said first hand written ink word has been matched to said associated candidate word;

displaying said candidate list including said plurality of candidate words and said associated confidence levels on said display screen of said pen-based computer system; and updating a training database with training data associated with a candidate word that corresponds to said practice word, such that when a second handwritten word is entered, said training data may be utilized to recognize said second handwritten word with greater accuracy.

34. A computer readable medium as recited in claim 33 wherein said candidate list has an order of said candidate words from the most confidently recognized candidate word to the least confidently recognized candidate word and wherein said program instructions further perform a step of highlighting only the candidate word in said candidate list that corresponds to said practice word to indicate the position of said corresponding candidate word in said order of candidate words.

35. A computer readable medium as recited in claim 33 wherein said step of displaying a practice word that is easily recognized includes retrieving a random word from a dictionary tree.

36. A computer readable medium as recited in claim 33 wherein said step of displaying a word recognized with difficulty includes selecting a random word from a predetermined list of difficult words.

37. A computer readable medium as recited in claim 33 wherein said first handwritten ink word is received on a display screen of said pen-based computer system by a user using a stylus.

38. A computer readable medium as recited in claim 33 wherein said step of displaying said candidate list includes displaying only a predetermined number of candidate words having the highest confidence levels generated by said recognizer.

39. A computer readable medium as recited in claim 37 wherein said step of updating a training database includes saving said training data associated with said candidate word which matches said practice word such that said practice word is associated with said training data.

* * * * *

UNITED STATES PATENT AND TRADEMARK OFFICE
CERTIFICATE OF CORRECTION

PATENT NO. : 5,680,480
DATED : October 21, 1997
INVENTOR(S) : Beernink et al.

It is certified that error appears in the above-indentified patent and that said Letters Patent is hereby corrected as shown below:

<u>IN THE CLAIMS</u>:

Column 20, lines 53-59: Delete claim 20.

Signed and Sealed this

Twenty-fourth Day of February, 1998

*Attest:*

BRUCE LEHMAN

*Attesting Officer*    *Commissioner of Patents and Trademarks*